United States Patent [19]

Daneshvar et al.

[11] Patent Number: 5,209,218

[45] Date of Patent: May 11, 1993

[54] DEEP FRYING APPARATUS

[75] Inventors: Manouchehr Daneshvar, Novi; William E. Kraemer, Sterling Heights, both of Mich.

[73] Assignee: Combustion Concepts, Inc., Detroit, Mich.

[21] Appl. No.: 870,690

[22] Filed: Apr. 17, 1992

[51] Int. Cl.[5] .............................................. A47J 27/00
[52] U.S. Cl. .................................. 126/391; 126/374; 126/376; 99/403
[58] Field of Search .............. 126/374, 373, 376, 391, 126/351, 360 R, 343.5 A; 99/403

[56] References Cited

U.S. PATENT DOCUMENTS

| | | | |
|---|---|---|---|
| 2,176,869 | 10/1939 | Childs | 126/391 |
| 3,809,062 | 5/1974 | Moore et al. | 126/369 |
| 3,938,948 | 2/1976 | Moore et al. | 431/347 |
| 3,948,593 | 4/1976 | Moore et al. | 431/8 |
| 4,091,801 | 5/1978 | Lazaridis et al. | 126/378 |
| 4,206,742 | 6/1980 | Johnson | 165/901 |
| 4,397,299 | 8/1983 | Taylor et al. | 126/391 |
| 4,550,711 | 11/1985 | Griffiths | 126/360 R |
| 4,690,127 | 9/1987 | Sank | 126/391 |
| 4,751,915 | 6/1988 | Price | 126/391 |
| 4,848,317 | 7/1989 | Prudhomme | 126/391 |
| 4,848,318 | 7/1989 | Brewer | 126/390 |
| 4,858,592 | 8/1989 | Hayek et al. | 126/373 |
| 4,898,151 | 2/1990 | Luobba et al. | 126/391 |
| 4,913,041 | 4/1990 | Taber et al. | 126/391 |

Primary Examiner—Carroll B. Dority
Attorney, Agent, or Firm—Harness, Dickey & Pierce

[57] ABSTRACT

A high efficient gas fired frying apparatus for deep frying food is disclosed. The gas fired frying apparatus is comprised of a supply system for air and fuel gas, a compression system, a burner system, a combustion chamber, a heat exchanger system and an exhaust system. The air and fuel gas are mixed and pressurized prior to being introduced to the burner system. The burner system works in conjunction with the combustion chamber to support combustion by balancing the premixture velocity with the flame velocity such that smooth and complete combustion occurs. The high velocity components of combustion are directed through a heat exchanger which transfers the heat to the cooking oil. The exhaust system recovers additional energy from the products of combustion and a catalytic converter may be added for removal of unwanted pollutants.

48 Claims, 8 Drawing Sheets

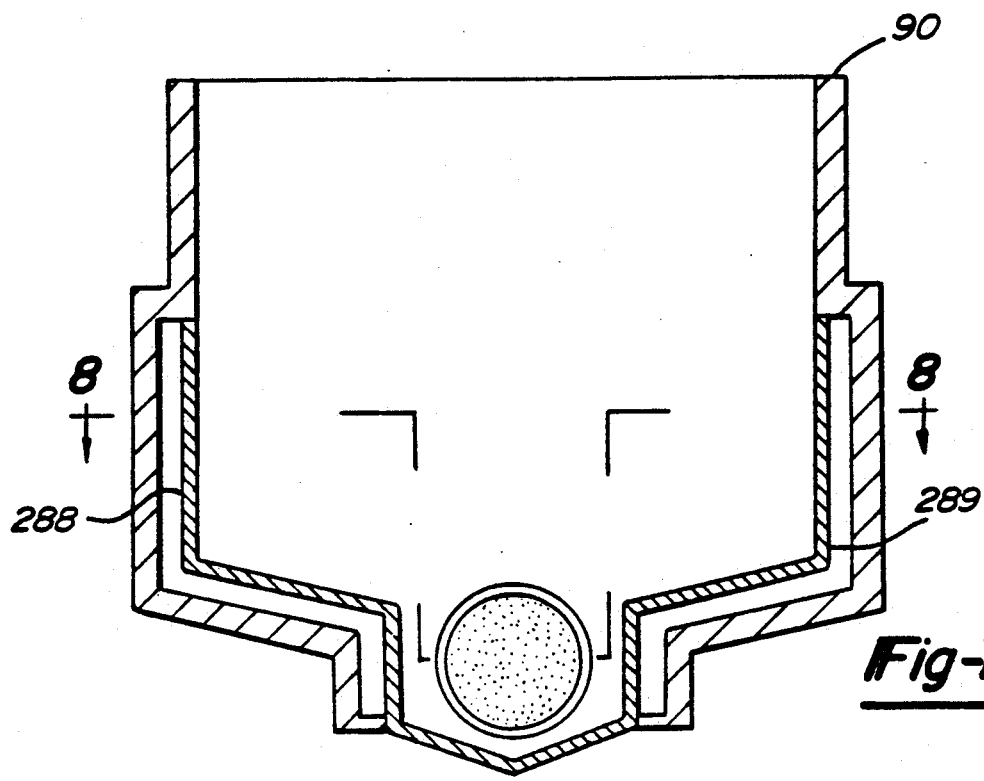
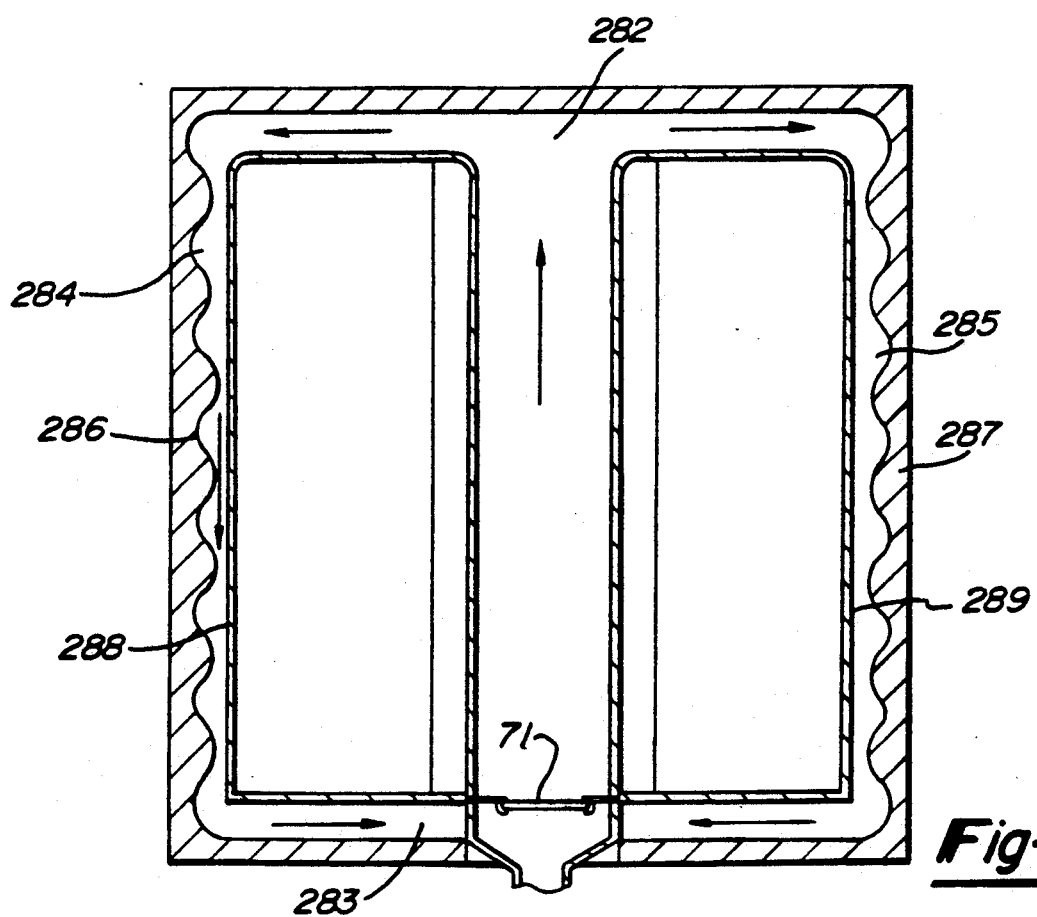

DEEP FRYING APPARATUS

BACKGROUND OF THE INVENTION

This invention relates to a frying apparatus. More particularly, this invention relates to a gas-fired frying apparatus for use in restaurants and institutional kitchens for frying fish, poultry, potatoes and other foods in a frypot containing frying oil.

The current state of the art for deep fryers is apparatuses which are comprised of a vat or frypot in which a quantity of cooking oil is heated to a predetermined temperature for so called deep fat frying. There are several long standing concerns and problems associated with these types of apparatuses.

The first problem with a deep fat frying apparatus is its relatively low efficiency as compared to modern day residential furnaces or commercial boilers. With the rising cost of fuel gas coupled with the question of its long term supply, it is imperative that a higher efficiency level for all fuel gas appliances be obtained. The apparatus within this invention has addressed this issue by reaching a higher level of unit efficiency. The unique features of the pressurized combustion process within this invention provides for an even higher level of efficiency by utilizing an auxiliary heat recovery system which can bring the units overall efficiency to approximately 90%.

Another concern with deep fat frying apparatus is the cost of the cooking oil. The health conscious trend of consumers has caused most restaurants/institutional kitchens to go to higher cost vegetable oils for cooking. Since the cost of the oil is the most costly component of the deep fat frying operation, any reduction in the amount of oil used is beneficial. One design within this invention in an apparatus that requires approximately 12% less cooking oil.

Still another concern with deep fat frying equipment is environmental issues. The future allowable emission levels for such equipment will surely be lower. This will present a problem for the restaurant/institutional kitchen because of the fact that this type of equipment is often one of the most widely used and most important cooking apparatuses within the operation. The apparatus presented in this invention addresses this concern by producing lower emissions and the apparatus has the flexibility to further accommodate toxic emissions or materials via a catalytic converter.

Still another concern with deep fat frying equipment is the overall taste and quality of the foodstuffs as all the above issues come to bear. Deep fat frying apparatuses used in restaurants and institutional kitchens, including so called fast food dispensers, must be capable of rapid warm up and maintaining a uniform temperature of the cooking oil over a specific time period including when relatively large loads of raw foodstuffs are placed in the frypot. These apparatuses must accommodate foodstuffs from potatoes to poultry, each with its own unique heating requirements, while maintaining consistency and uniformity of taste. Much research and testing has been done to determine the optimum frying time/temperature within a given cooking oil to ensure quality of taste. This invention provides for the pre-programming of a time/temperature function and, when combined with the unique features of the invented apparatus, will provide for precise control of these stringent time/temperature functions in a highly efficient manner. This flexibility ensures the quality of taste for a variety of foodstuffs with minimum energy consumption.

BRIEF DESCRIPTION OF THE DRAWINGS

The above-mentioned and other features and objectives of this invention and the manner of attaining them will become more apparent and the invention itself will be better understood by reference to the following description of the invention taken in conjunction with the accompanying drawings wherein:

FIG. 7 is an end elevation view partially in cross section of another embodiment of the high pressure deep frying apparatus in accordance with the present invention.

FIG. 8 is a sectional view partially in cross section taken along line 8—8 of FIG. 7.

DETAILED DESCRIPTION OF THE PREFERRED EMBODIMENT

Figure 1:
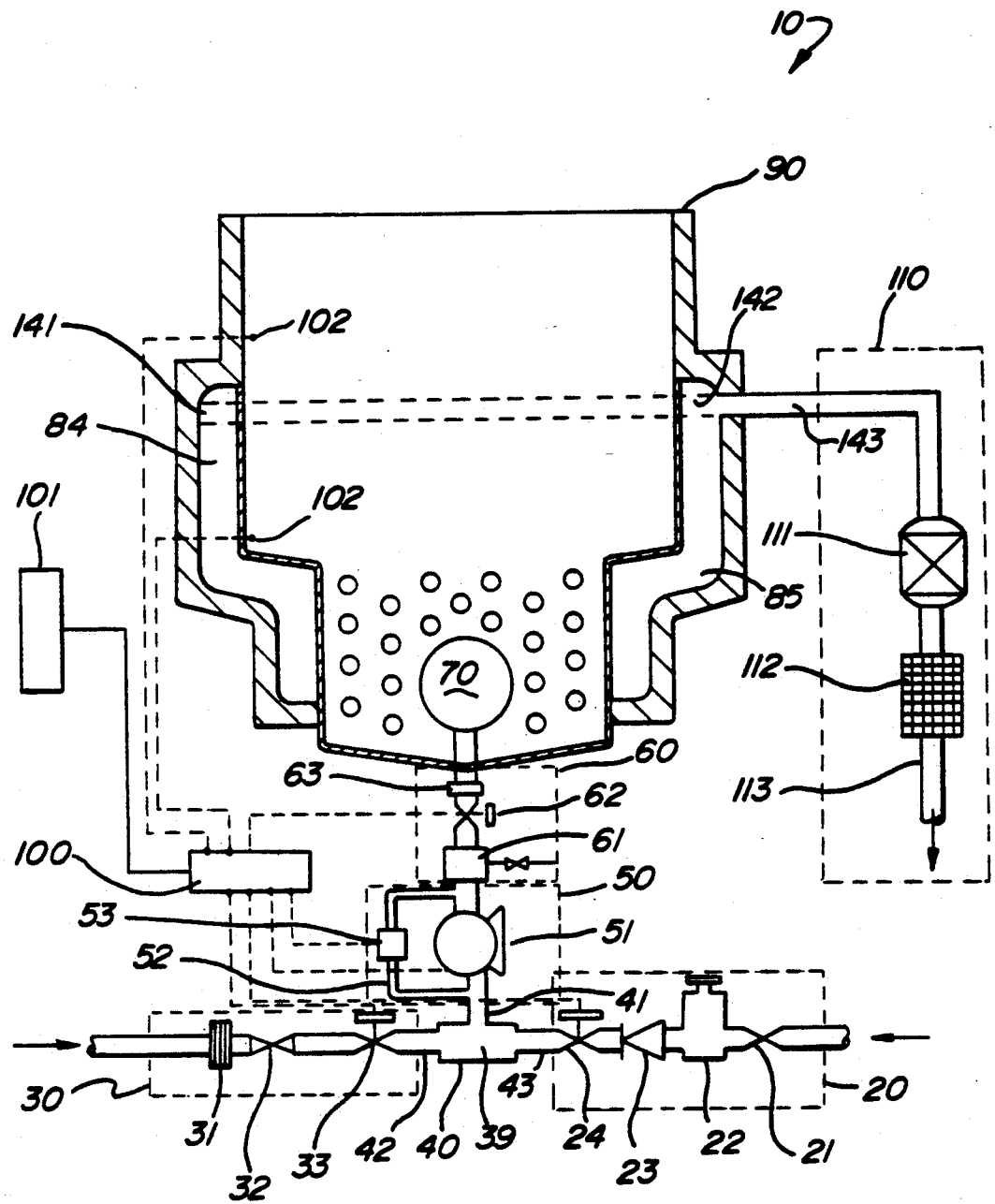
FIG. 1 is a schematic flow diagram and end view partially in cross section of a high pressure deep frying apparatus according to the present invention and embodying a controlled high efficient clean burning process.
Figure 2:
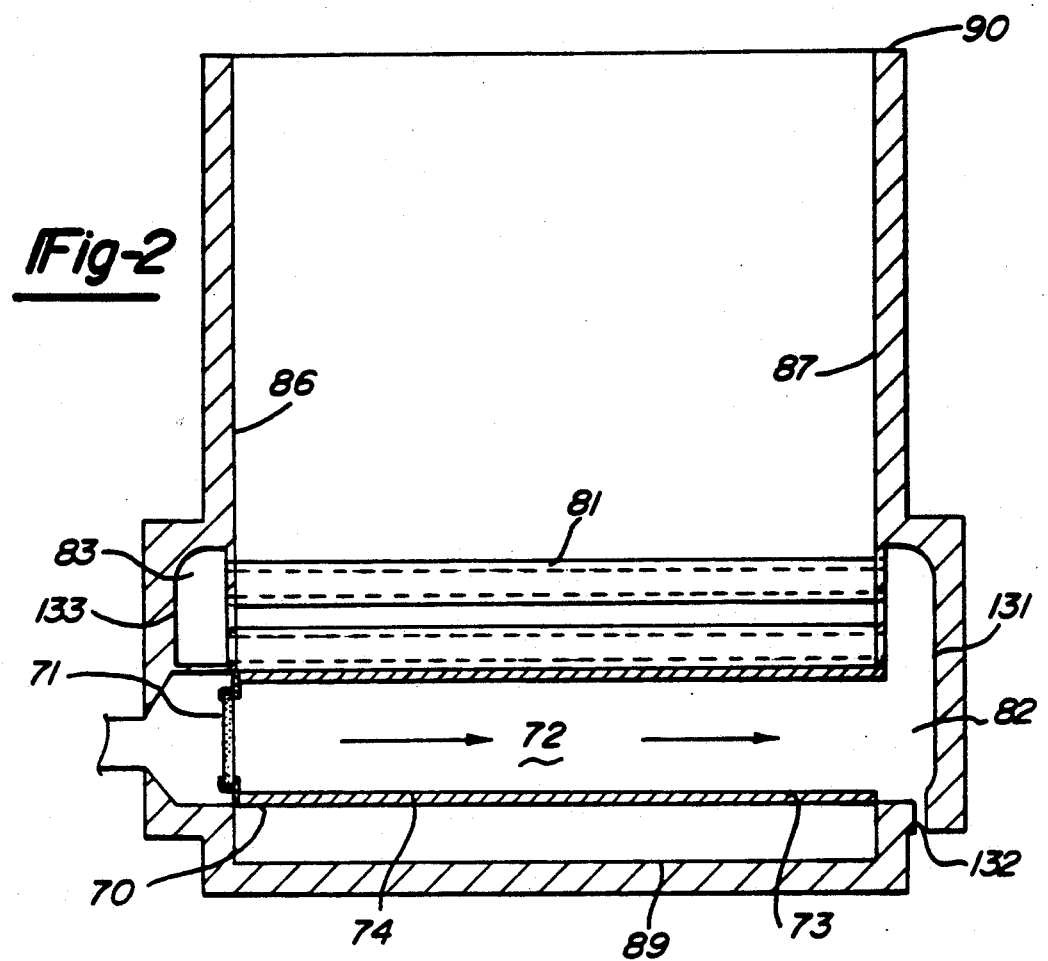
FIG. 2 is a side elevation view partially in cross section of the burner, combustion chamber, heat exchangers and frypot of FIG. 1.

Referring now to the drawings, FIGS. 1 and 2 are a schematic diagram of a deep frying apparatus for use in restaurants and institutional kitchens for frying fish, poultry, potatoes and other foods in a frypot containing cooking oil according to the present invention and is designated by the reference numeral 10.

The fat frying apparatus is comprised of a fuel gas supply system 20, an air supply system 30, a mixing unit 40, a compressing system 50, a burner delivery system 60, a burner assembly 70, a fry pot 90, a central control unit 100 and an exhaust system 110.

Air is supplied by the air supply system 30 to the frying apparatus 10 through filter 31 and can be comprised of preheated air, fresh air or any combination of the two. The size and type of the filter 31 will depend on parameters such as compressor 51 requirements, and incoming air quality/quantity. The air filter 31 will remove unwanted dust and other contaminating particles from the air stream and thereby protect the mixing unit 40, the compressing system 50 and the burner assembly 70. A manually operated isolating valve 32 provides a means of turning off the air supply in the event of maintenance and/or an emergency shut down. A control valve 33 is activated through the central control unit 100 and controls the supply of filtered air to the system. The control valve 33 would normally turn on and off and/or modulate the supply of air to the system. The isolating valve 32 is a secondary safety valve as the absence of air will terminate the combustion process.

The fuel gas supply system 20 is supplied with fuel gas from a direct piped supply (not shown) such as from a natural gas distribution company, or from storage tanks. Preferably, the fuel gas would be natural gas but it could be any other suitable fuel gas, such as propane. A manually operated isolating valve 21 provides a means of cutting off the supply of fuel gas to the remainder of the system. A governor 22 controls the pressure of the fuel gas to ensure the delivery of the air and fuel gas at pressures suitable for mixing. A check valve 23 is provided as a safety device to allow the flow of fuel gas in one direction only. As this is a pressurized system, a failure or loss of suction pressure will close the check valve 23 and stop the flow of fuel gas. A control valve 24 is in series with the governor 22 and in communication with the central control unit 100 to turn on or off and/or modulate the supply of fuel gas. Control valve 24 in conjunction with air control valve 33 are used to ensure that the correct predetermined ratio of air and fuel gas is being supplied to the mixing unit 40. The governor 22 is in communication with the air supply system 30 to adjust the system pressure and thereby ensure proper mixing. Isolating valve 21 and check valve 23 are additional safety devices to shut off the supply of fuel gas should an abnormal situation arise.

Figures 11, 16:
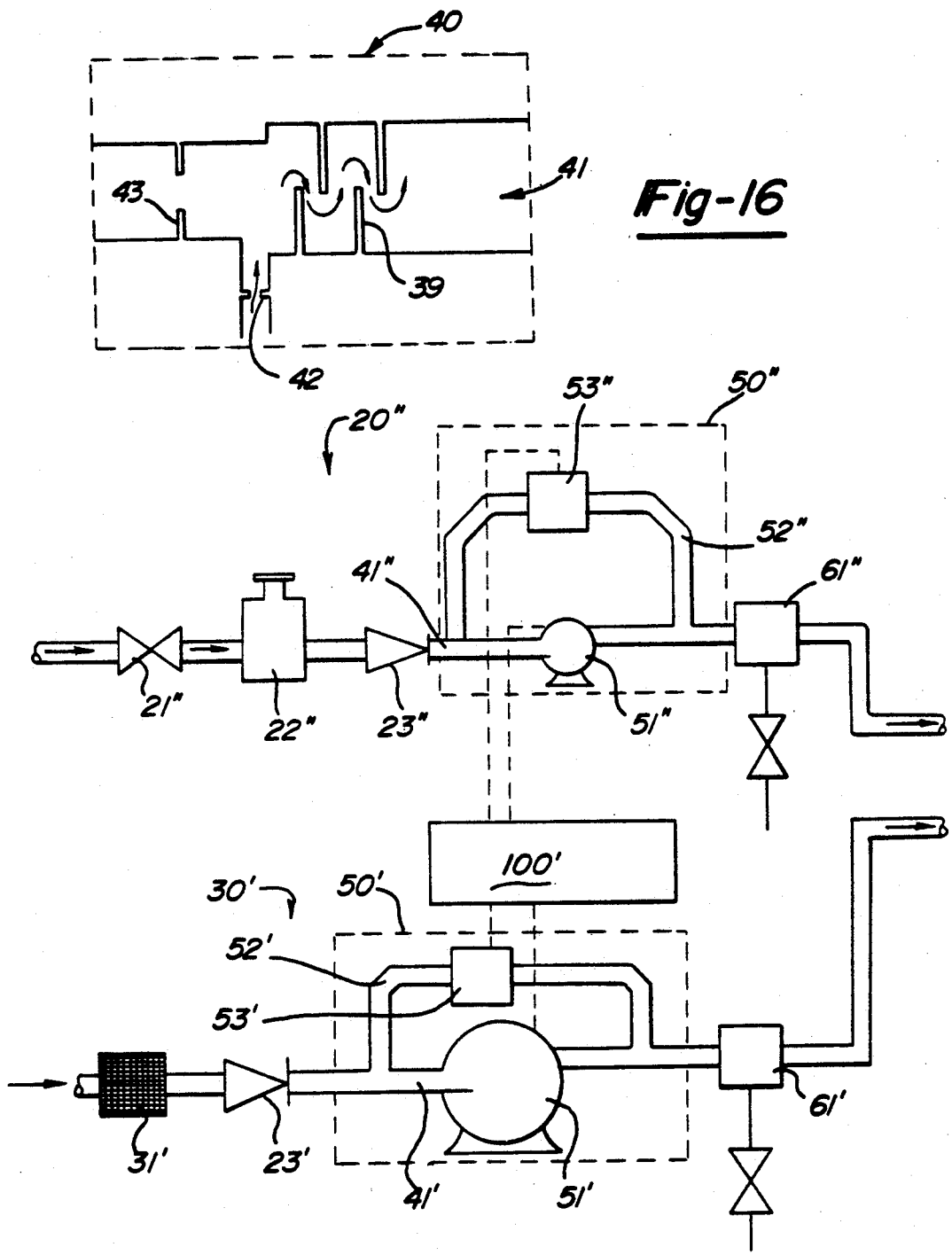
FIG. 11 is a schematic flow diagram of another embodiment of a system for supplying fuel gas and air to the burner system for the high pressure deep frying apparatus in accordance with the present invention.
FIG. 16 is a sectional view of the mixing unit of the present invention.

Referring to FIGS. 1 and 16 the mixing unit 40 has a pair of inlet orifices 42 and 43, respectively, to receive the fuel gas and air. The mixing unit 40 mixes the two gasses by passing the fuel gas and air around and through a plurality of baffles 39 to form a combustible gas premixture, and presents the gas premixture to the demand or input side 41 of compressing system 50. The combination of the suction from compressor 51 and the design of the mixing units orifices 42 and 43 in conjunction with the baffles 39 results in a thorough mixing of the air and fuel gas.

The compressing system 50 has an input side 41 which leads to the compressor 51 which increases the pressure of the combustion premix to provide combustible gas to the burner assembly 70 at super atmospheric pressure. Preferably and in accordance with this invention, this pressure would be between one and fifteen PSIG. The size and type of compressor 51 is well known in the art and will be determined by the demand or capacity of the particular deep fat fryer.

The compressing system 50 also includes a delivery system which is comprised of a pressure sensitive governor 53 and a return line 52 which is used with compressor 51 to control and balance the firing rate of the frying apparatus 10 when the frying apparatus 10 is operating in its various modes. The pressure sensitive governor 53 is controlled by the central control unit 100 and determines the amount of premixed gas which will be recirculated through return line 52 and the amount of gas available to the burner assembly 70 to satisfy the fryer apparatus' requirements. This greatly enhances the units flexibility and its turndown characteristics. Likewise, this pressure sensitive governor 53 assures that a continuous non-pulsating flow of pressurized fuel gas premixture is supplied to the burner assembly 70.

The burner delivery system 60 includes an oil trap 61 or coalescing filter to remove the oil from the combustion premixture. The oil trap 61 is provided between the outlet of compressor 51 and the control valve 62. The control valve 62 is controlled by the central control unit 100 and determines the precise amount of premixed gas which will be delivered to the burner assembly. The flame trap 63 is provided to stop the propagation of a backward flame from the burner that could damage the equipment. The flame trap 63 is a safety device to ensure that upon loss of pressure and/or a reduction in premix flow velocity, the combustion mixture will not create a flash back or back burn through the system.

The filter 31, isolating valves 21 and 32, control valves 24, 33 and 62, check valve 23 and the orifices are all commercially available items and are well known in the art. The compressor 51, oil trap 61 and pressure governors 22 and 53 are also commercially available items and are well known in the art.

The burner assembly 70 includes a flow/diffusion element and an ignition source for combusting the fuel gas/air premix. The burner 71 operates by receiving and igniting the high velocity/pressurized gas premix with minimal pressure loss through the burner 71. As will be discussed, herein, the combustion burner 71 can be comprised of a porous fiber metallic surface combustion burner or a jet nozzle burner design. Each burner 71 described herein will achieve the required flame stability, have a desired pressure drop, and operate under the various operating conditions of this invention.

The high velocity flame emanating from the burner 71 will be contained and the gas premix combustion reaction will be allowed to go to completion within a cylindrically designed combustion chamber 72. This combustion chamber is preferably 2" to 5" in diameter depending on the designed firing range and capacity of the frying apparatus 10. The combustion chamber 72 extends from the front wall 86 to the back wall 87 of frypot 90. The combustion chamber resides in the frypot 90 at a distance above the frypot's bottom wall 89 which facilitates easy access for cleaning purposes. The combustion chamber 72 has a layer of insulating material 73 which is preferably between ⅛" thick to ⅜" thick depending on the designed firing range and the fryer's capacity. The insulating material 73 is attached to the inside wall 74 of the combustion chamber 72. The insulation starts at the intersection of the combustion chamber 72 and the burner assembly 70 and preferably continues to between 4" and 16" in length along the combustion chamber inside wall 74. The design of the combustion chamber 72 and the length and thickness of the insulating material depends on the capacity of the frypot 90 and its operating firing range. The insulating material is necessary for some designs to ensure the combustion reaction goes to completion in an efficient manner while producing a minimum level of pollutants. The combustion chamber 72 has a slight pitch from the front wall 86 of the frypot to the back wall 87 in order for any condensation which might form during non operation periods to collect in the heat exchanger 82 and then be drained by drain plug 132.

The high velocity products of combustion exiting the combustion chamber 72 enter into the first section 82 of the heat exchanger assembly. Heat exchanger section 82 has insulating material attached to its outside wall 131 to reduce the heat energy loss. The high convective heat transfer rate of the super atmospheric products of combustion transfer heat energy to the inside wall of the heat exchanger section 82 and into the cooking oil. The high velocity products of combustion then travel through heat exchanger section 81 of the heat exchanger assembly. A drain plug 132 resides at the bottom of heat exchanger section 82 as mention above, such that any condensation which has formed and accumulated can be drained off.

Heat exchanger section 81 is comprised of a plurality of tubes which reside in frypot 90. These tubes start at heat exchanger section 82 and terminate at heat exchanger section 83 while residing in frypot 90. These tubes are slightly inclined from the front wall heat exchanger section 83 to the back wall heat exchanger section 82 so that any condensation which might form when the unit is not in its operating mode can drain into heat exchanger section 82 where the drain plug 132 resides. Preferably, the individual heat exchanger tubes of heat exchanger section 81 can range between ⅛" to ⅝" in diameter and there can be between 5 and 50 individual tubes within frypot 90 depending on the capacity and firing requirements of the frying apparatus 10.

Heat exchanger section 83 is attached to the ending portion of heat exchanger section 81 and receives the reduced temperature, high velocity products of combustion from the individual tubes of heat exchanger section 81. Heat exchanger section 83 is insulated with insulation material on its outer wall 133 to reduce heat energy loss. Heat exchanger section 83 is connected to two side wall heat exchanger sections 84 and 85. Heat exchanger sections 84 and 85 are also insulated on their outside walls with insulation material to reduce heat energy loss. Heat exchanger sections 83, 84 and 85 have high convective heat transfer products of combustion traveling through them and transfer heat energy to the inside wall of their respective heat exchanger sections and thus into the cooking oil. Heat exchanger sections 84 and 85 start at the bottom front wall 86 of frypot 90 and extend to the top of back wall 87. Each of these exchanger sections 84 and 85 have a slight incline towards the back wall for condensation drainage. Each of these heat exchanger sections 84 and 85 have exhaust openings 141 and 142 for exiting the combustion gasses to the exhaust system 110. The exhaust system 110 comprises an exhaust manifold 143 that will either connect to an exhaust vent (not shown) or it will connect to a secondary heat recovery system 111 where any residual heat can be recovered for use to pre-heat the incoming air or for other purposes. The combustion gasses can then be exhausted to the outside and/or can be sent through a fine particle separator/catalytic converter 112 to remove pollutants prior to outside exhausting. If insufficient pressure/velocity exist to effectively move the combustion gasses through the secondary heat recovery system 111 or fine particle separator/catalytic converter 112, an induced draw motor (not shown) can be used. The heat recovery system 111 and/or catalytic converter 112 are of a design which requires a low pressure drop.

Frypot 90 is insulated such that overall energy loss is held to a minimum. A suitable insulating material for use on the frypot and heat exchangers is well known by those skilled in the art.

A central control unit 100 is provided which ensures that the correct volume and desired mixture of gasses are supplied to the mixing unit according to pre-programmed time/temperature functions stored in control panel 101. A plurality of temperature probes 102 are positioned within the frypot 90 to indicate the current temperature of the cooking oil. The control panel 101 sets the operating parameters and controls them via the central control unit 100 which also controls the various operating modes of the fat frying apparatus. An exhaust system 110 is also provided as discussed above where the combustion gasses are expelled and/or further processed by a secondary heat recovery system 111 and/or a catalytic converter 112 to reduce pollutants before being exhausted to the atmosphere at 113.

Figure 3:
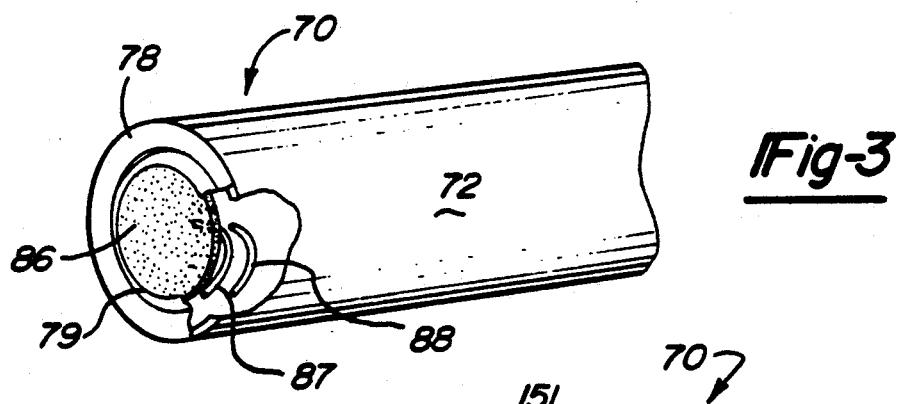
FIG. 3 is a perspective view of a surface combustion burner for use in the high pressure deep frying apparatus of FIG. 1.

FIG. 3 shows one embodiment of burner assembly 70 according to the present invention and is illustrated as a surface burner which is formed of a gas permeable fiber metallic material 86. Suitable fiber metallic materials include Fercalloy a Registered Trademark of and available from U.K. Atomic Energy Authority, U.K., and Behifor, Bekinox, Bekitex and Bekitherm, all Registered Trademarks of and available from N.V. Bekaert, S.A., Belgium. The fiber metallic material 86 is held in the burner assembly by retainers 79 which are connected to the front plate 78 of combustion chamber 72. An ignitor 87 and flame sensor 88 are attached to the combustion chamber front plate 78 and curved so that they reside in front of the fiber metallic burner surface to ignite the high velocity/super atmospheric premix emanating from the burner surface. The high velocity/super atmospheric combustion phenomenon along with the nature of the fiber metallic burner results in a faster rate of combustion reaction, and thereby produces less unwanted pollutants such as $No_x$.

Figure 4:
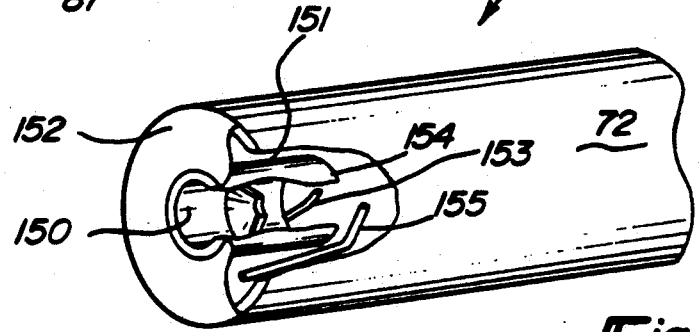
FIG. 4 is a perspective view of a high pressure jet burner for use in the high pressure deep frying apparatus of FIG. 1.

FIG. 4 is directed to another embodiment of burner assembly 70 according to the present invention and is illustrated as a jet nozzle burner 151. The cylindrical jet nozzle burner 151 is connected to the combustion front plate 152. The high velocity/super atmospheric premix is presented to the burner 151 at inlet 150. The premix gasses travel through uniquely designed angular orifices inside the burner and are presented to the ignitor 153 for ignition of the combustible premix. The jet flame emanating from the front opening 154 of the burner continues into the combustion chamber 72. A flame sensor 155, a safety device, resides in front of the jet nozzle burner front opening 154 to ensure ignition occurs. Both of the above described burner designs result in a minimum pressure drop.

Figure 5:
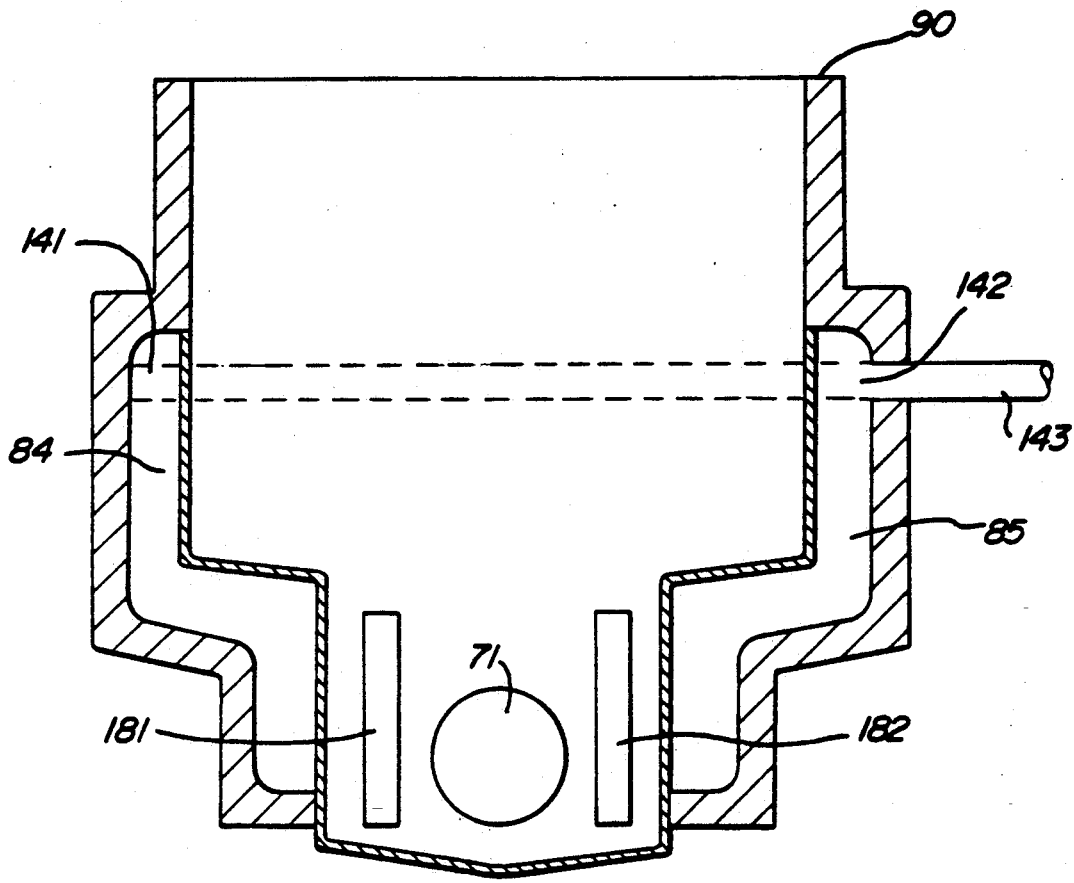
FIG. 5 is an end elevation view partially in cross section of another embodiment of the high pressure deep frying apparatus in accordance with the present invention.
Figure 6:
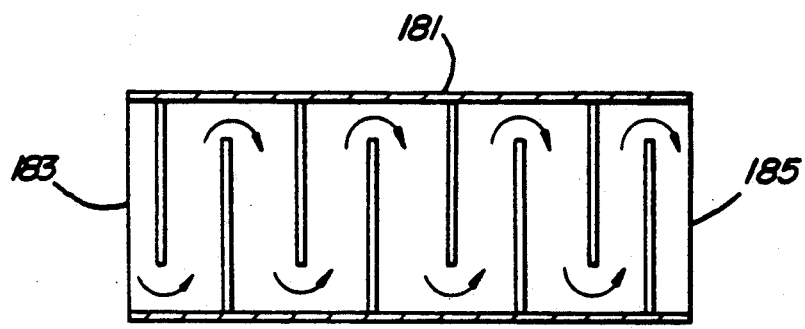
FIG. 6 is a longitudinal sectional view through one of the flat heat exchangers shown in FIG. 5.

FIG. 5 is a heat exchanger assembly according to another embodiment of the present invention. In this design, heat exchanger section 81 is replaced by heat exchanger sections 181 and 182. These heat exchangers are wafer designed heat exchangers that are connected to heat exchanger sections 82 and 83 and reside in frypot 90 and in the cooking oil. High velocity/super atmospheric products of combustion exit heat exchanger section 82 and enter heat exchanger section 181 at interface 183 and travel through heat exchanger section 181 then exit into heat exchanger section 83 at interface 185. In a similar manner, the high velocity/super atmospheric products travel through heat exchanger section 182. This alternative design provides added flexibility for cleaning of the frypot without loss of higher efficiency. The heat exchanger sections 181 and 182 are designed with baffles as shown in FIG. 6 designed to create differential velocities of the products of combustion as they travel through the exchanger sections and thereby increase the effective heat energy transfer to the cooking oil.

FIGS. 7 and 8 show a deep fryer apparatus according to another embodiment of the present invention. As illustrated in FIGS. 7 and 8, the back wall heat exchanger 282 is connected to two sidewall heat exchanger sections 284 and 285. The outer walls 286 and 287 are curved in an oscillating pattern as to be closer then farther from the frypot walls 288 and 289. The outer walls of heat exchanger sections 284 and 285 are insulated from their surrounding environment in order to minimize the loss of thermal energy from the heat exchangers. The high velocity/super atmospheric products of combustion travel from the back wall heat exchanger section 282 through the side wall heat exchangers 284 and 285 to the front wall heat exchanger section 283. The unique oscillating configuration of heat exchanger sections 284 and 285 cause the products of combustion to travel through the exchanger sections at a variable velocity, facilitating the heat transfer to the frypot walls and subsequently to the cooking oil. In this embodiment, the exhaust opening resides in heat exchanger section 283 and connects to exhaust system 110. This design enables the frypot 90, which holds the cooking oil, to be smaller in size than conventional lower efficiency deep fryers such that 8 to 20% less cooking oil is required.

Figure 9:
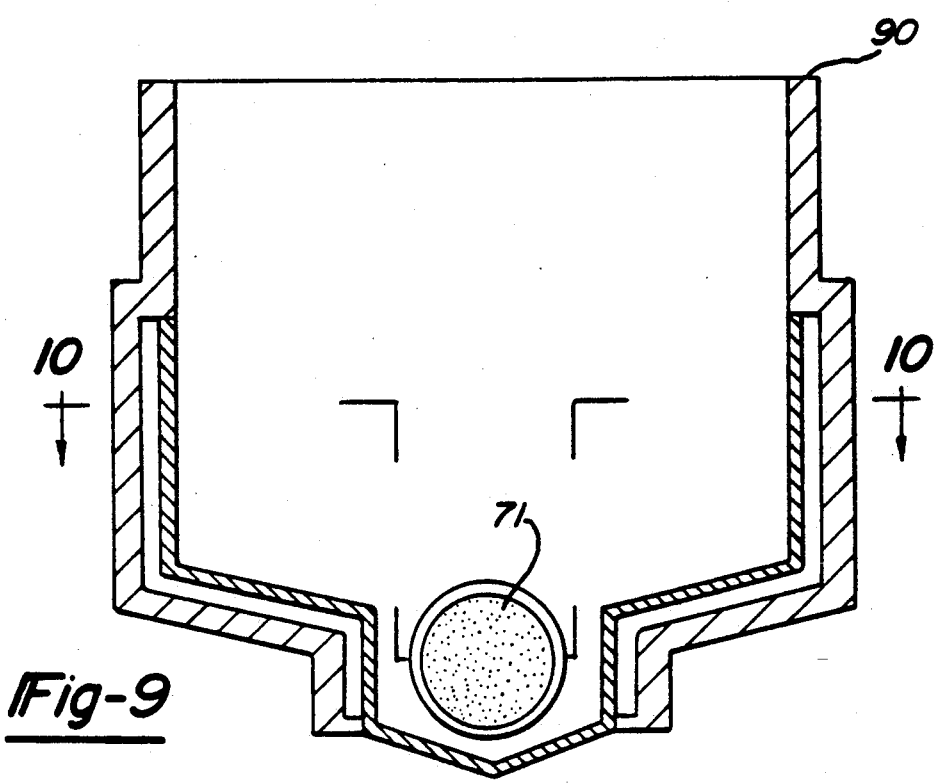
FIG. 9 is an end elevation view partially in cross section of another embodiment of the high pressure deep frying apparatus in accordance with the present invention.
Figure 10:
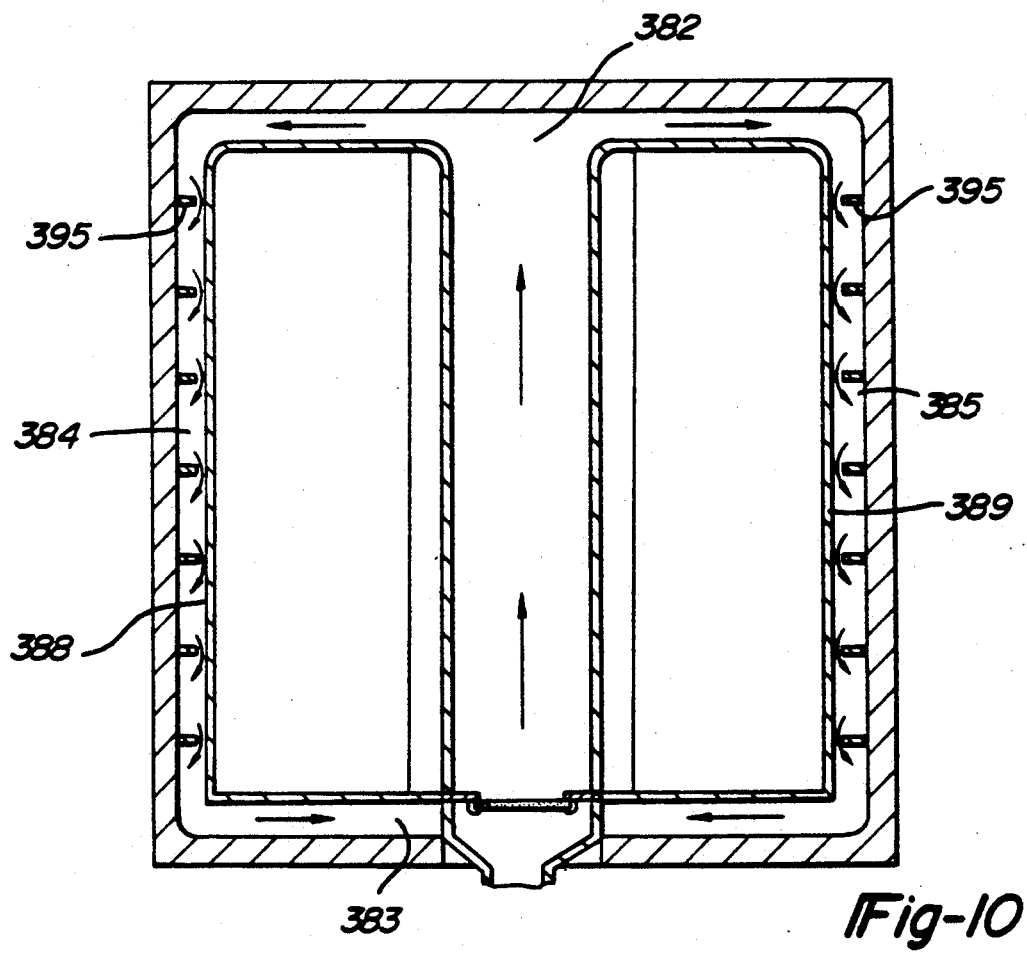
FIG. 10 is a sectional view partially in cross section taken along line 10—10 of FIG. 9.

FIGS. 9 and 10 show another embodiment of the present invention which reduces the amount of cooking oil required to cook the foodstuffs, while attaining high energy efficiency levels. Heat exchanger sections 384 and 385 interface with the frypot 90 at 388 and 389 to effectively transfer thermal energy from the super atmospheric/high velocity products of combustion to the frypot walls and subsequently to the cooking oil. Heat exchanger sections 384 and 385 communicate with the heat exchanger section 382, where the products of combustion are introduced into the exchangers and travel through the heat exchanger section 384 and 385 to heat exchanger section 383 where they exit the heat exchanger section 383 to the exhaust system 110. The heat exchanger sections 384 and 385 have a series of straight baffles 395 attached to their outer walls and extending towards frypot walls 388 and 389, but do not communicate with such walls. There is a sufficient opening to ensure proper flow of the high velocity/super atmospheric products of combustion through the exchangers. The baffles 395 control and guide the flow of the products of combustion as they transverse the heat exchanger sections 384 and 385, resulting in high heat energy transfer to the frypot walls. This design enables the frypot 90 to be smaller in size and thereby requires less cooking oil than conventional models. The high cost of cooking oil makes this configuration less expensive to operate while maintaining high efficiency.

FIG. 11 is a schematic view of another embodiment of the systems for controlling the supply of air and fuel gas to the combustion burner. In the description of the systems of FIG. 11 prime (') and double prime (") will be used with the reference numerals when the component is equivalent to a component as described in connection with the control system of FIGS. 1 and 2.

In the control system of FIG. 11 the air and fuel gas supply systems 20" and 30' respectively each have their own separate compressor subsystem. Air supply flows through a filter 31' that is of the size and type which is needed for the particular frying apparatus 10. This will depend on a number of parameters such as the quality/quantity of the incoming air and the compressor requirements. The air exits the filter and proceeds through a check valve 23' which is used as a safety device. This will close the supply of air to the remainder of the system if insufficient pressure exist to open the valve. Pressure loss, compressor failure or a number of other occurrences could cause the valve 23' not to open and thereby starve the combustion premix of the required air. The air supply passes through the check valve 23' to the suction side 41' of compressor 51'. A bypass/delivery system 50', including bypass line 52' and pressure sensitive governor 53', is provided whereby a portion of the exiting compressed air can be recirculated back to the suction side of the compressor 51'. The volume of air recirculating through the bypass subsystem 50' is controlled by the governor 53', which in turn is controlled by the central control unit 100'. The bypass subsystem 50' ensures that the proper amounts of compressed air is supplied to the mixing unit (not shown) and subsequently the burner assembly for clean efficient combustion, to support the deep fryers firing rate, and to ensure smooth non-pulsating combustion. The super atmospheric air exiting the compressor travels through an oil trap 61' prior to entering the mixing unit. This oil trap is similar to the one described in FIGS. 1 and 2 and serves the same purpose.

Fuel gas flows through an isolating valve 21", which provides for a manual shut off of the fuel gas supply. This could be for maintenance or for emergency reasons. From the isolating valve 21" the fuel gas goes through the pressure governor 22" which regulates the volumetric flow of fuel gas and air at the required pressure. A second safety check vale 23" is located prior to the suction side 41" of compressor 51" provided for the fuel gas. An oil trap 61" is located down stream of the outlet side of the compressor 51". The check valve 23" will cut off the fuel supply if there is insufficient pressure to open the valve. The compressor 51" and its recirculating bypass/delivery subsystem 50", and oil trap 61" are similar and provide the same function as the components described in the single compressor air supply system of FIGS. 1 and 2.

The compressed air leaving the air supply system 20" and the compress fuel gas leaving the fuel gas supply system 30' enter a mixing unit similar to the mixing unit 40 of FIG. 1. After the mixing unit, the compressed fuel gas/air mixture goes through a control valve similar to control valve 62 of FIG. 1 and through a flame trap similar to the flame trap 63 of FIG. 1 prior to entering the burner assembly 70.

If the air is available at the required or higher pressure in sufficient quantity to support combustion, the air supply system 30' shown in FIG. 11 would only be comprised of a throughput air flow regulator and a control valve, which are not shown, instead of compressor subsystem 50'. The air flow regulator would provide the air at the required pressure and would work in tandem with the fuel gas pressure governor 22" while the air control valve would control the flow of air based on the input from the central control unit 100'. A flow control metering valve, which is not shown, is disposed in each of the air and fuel gas lines. These metering valves are operatively connected to a flow ratio controller, also not shown, which is operatively connected to control unit 100'. An actuator sends a signal to the air control valve to adjust the air volume as needed.

Further, if the fuel gas is available in sufficient quantity and at the required or higher pressure to support combustion, the fuel gas supply system 20" shown in FIG. 11 would only be comprised of a regulator, a pressure governor and a control valve all of which are not shown. These components work in the same fashion and perform the same function as described above for the air system.

Figure 12:
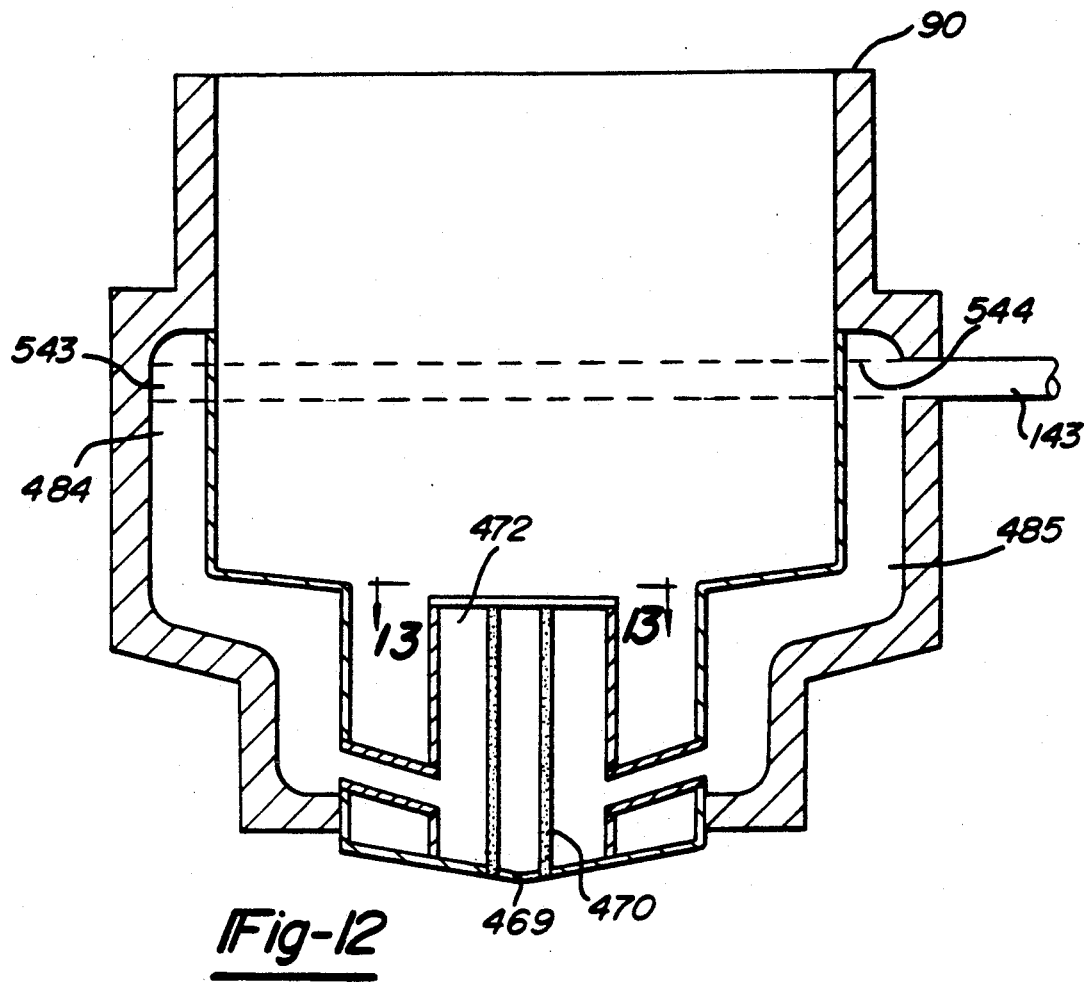
FIG. 12 is an end elevation view partially in cross section of another embodiment of the high pressure deep frying apparatus in accordance with the present invention.
Figure 13:
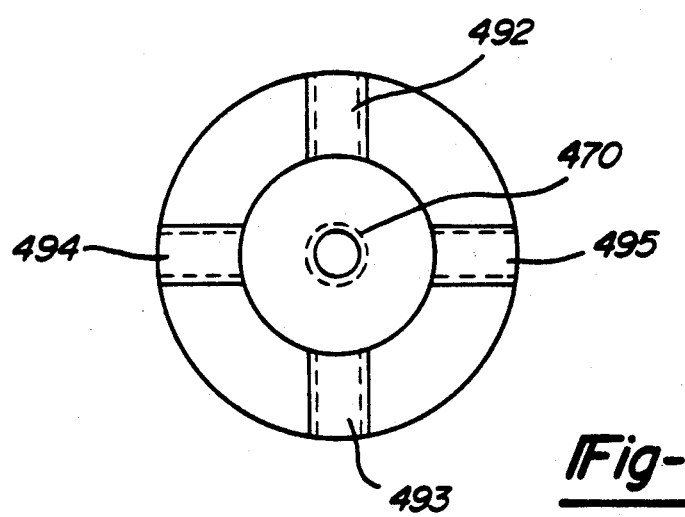
FIG. 13 is a plan view of the burner taken along lines 13'13 of FIG. 12.

FIG. 12 shows another embodiment of the present invention. This embodiment includes the burner assembly 470 for receiving and igniting the pressurized combustible gas premixture, the combustion chamber 472 where the pressurized combustion reaction occurs and the heat exchanger sections 482, 483 (not shown) and 484, 485 where the heat energy is efficiently transferred to the cooking oil within the frypot 90. The various systems for delivering a compressed fuel gas/air premixture to the burner assembly previously described are also utilized in this embodiment to provide the compressed fuel/gas air premixture. The burner assembly 470 is cylindrical in design with an inlet 469 at the base of the frypot 90 where the super atmospheric/high velocity gas mixture enters into the cylinder of the burner assembly 470. This cylindrical burner can be comprised of a porous fiber metallic material as described earlier. The high velocity/super atmospheric gas mixture emanates from the burner surface and is ignited by an ignitor, not shown, placed at the proper distance from the burner surface to ensure smooth combustion. The cylindrical designed combustion chamber 472 is of the right height and diameter to ensure complete combustion for the designed size and firing rate of the drying apparatus. There are four connecting tubes 492, 493, 494 and 495 which connect the combustion chamber to the walled heat exchanger sections 482, 483, 484 and 485. The high velocity/super atmospheric products of combustion emanating from the combustion chamber 472 enter into the heat exchanger sections 482, 483, 484 and 485 transferring their high convective heat energy to the cooking oil via the walls of frypot 90. The high velocity products of combustion travel through the heat exchanger sections to the exhaust openings 541, 542 (not shown) and 543, 544 at the top of the heat exchangers for exhausting the combustion gasses to the exhaust system 110 that will either be connected to an exhaust vent or a secondary heat recovery system and/or catalytic converter which functions and has the same benefits as explainer earlier.

Figure 14:
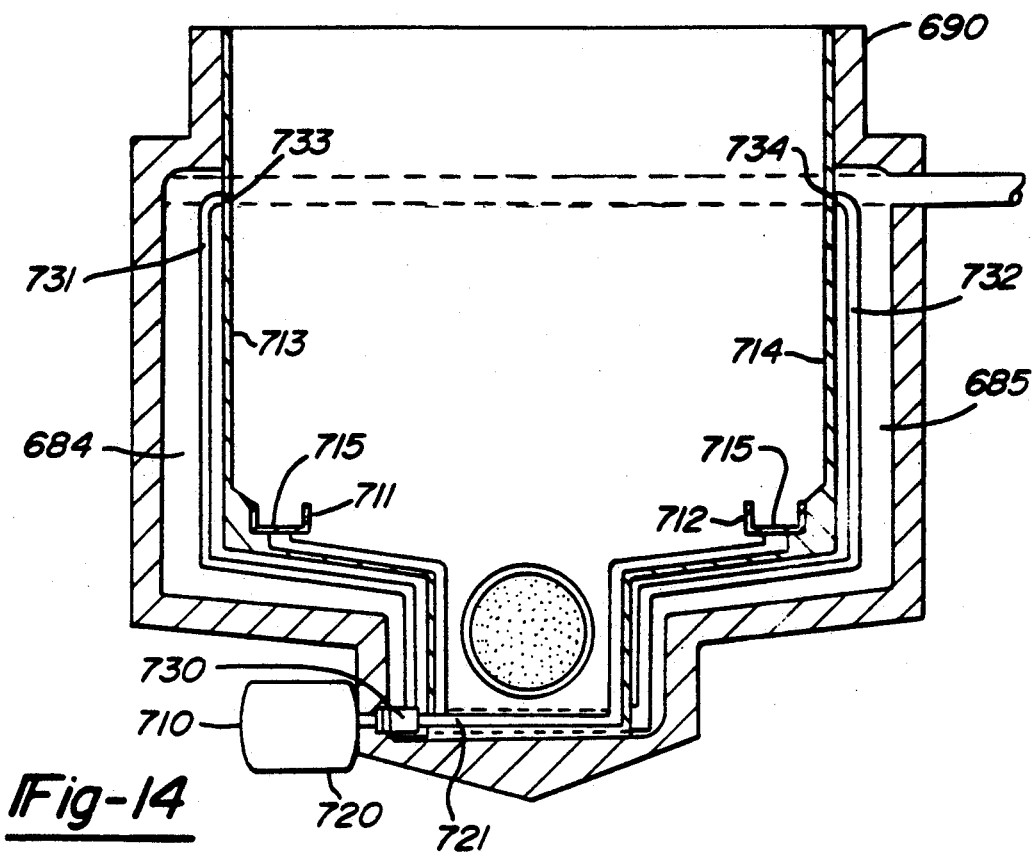
FIG. 14 is an end elevation view partially in cross section of another embodiment of the high pressure deep frying apparatus in accordance with the present invention.
Figure 15:
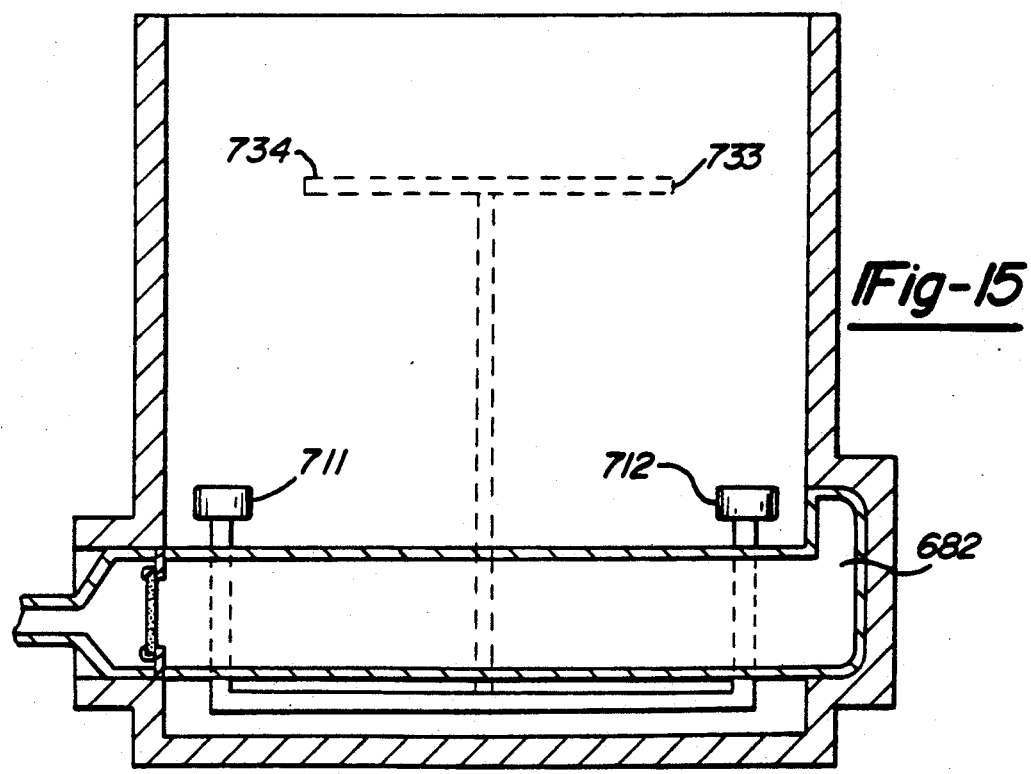
FIG. 15 is a side view partially in cross section of the frypot, heat exchanger and pumping/filtration system of FIG. 14.

FIG. 14 and 15 show another embodiment of the present invention. The frypot 690 and heat exchanger sections 682, 684 and 685 are similar to heat exchanger sections 82, 84 and 85 respectively and perform the same functions. The heat exchanger sections are part of the opposed walls and back wall of frypot 690. The pumping/filtration system 710 has two inlet openings 711 and 712 which are placed at the opposed side walls 713 and 714 along the tapered bottom of the frypot, one opening is position near the front wall and the other positioned near the back wall. The suction side 721 of the pump 720 draws in the cooking oil from frypot 690 through removable filters 715 into pump 720. The filtered cooking oil exits the pump at 730 and returns to the frypot through pipes 731 and 732. These pipes are enclosed within heat exchanger sections 684 and 685 so that the high velocity/super atmospheric products of combustion can transfer its high convective heat energy to the cooking oil within these pipes as it is being returned to the frypot. The return pipes 731 and 732 re-enter the frypot at 733 and 734 where the cleaned and heated cooking oil is discharged into the frypot. The pumping/filtration system reduces the cleaning and maintenance of these apparatuses and further improves their heat efficiency as the forced flow of the cooking oil improves the convective heat transfer from the super atmospheric/high velocity combustion process and the products of combustion traveling through the submerged combustion chamber within the cooking of frypot 690 and heat exchanger sections 682, 684 and 685. The inlet and discharge pipes of the pumping/filtration system are positioned inside heat exchanger sections 684 and 685 in order to receive heat energy from the high velocity products of combustion flowing through these heat exchanger sections. FIG. 15 is a side view showing the flow of the products of combustion as they travel through the heat exchanger sections and the positioning of the pumping/filtration system inlet openings.

While the above detailed description describes the preferred embodiment of the present invention, it should be understood that the present invention is susceptible to modification, variation and alteration without deviating from the scope and fair meaning of the subjoined claims.

What is claimed is:

1. A clean burning gas flame frying apparatus for cooking foods comprising:
   a frypot for holding cooking oil, said frypot including a heat exchanger and a housing defining a combustion chamber, said heat exchanger mated with said combustion chamber for transferring heat from said combustion chamber to said cooking oil;
   burner means located in the bottom of said frypot for combusting a pressurized fuel gas and air premixture for providing said heat, said pressurized fuel gas and air premixture being supplied to said burner means at a specified pressure, said housing surrounding said burner means;
   means for supplying air to said burner means;
   means for supplying fuel gas to said burner means;
   a mixing unit for said air and said fuel gas having an air inlet, a fuel gas inlet and an outlet, said mixing unit operable to create a fuel gas and air premixture, said mixing unit disposed between said burner means and said air and fuel gas supply means;
   means for compressing said fuel gas and air premixture to provide said pressurized fuel gas and air premixture and introducing said pressurized premixture to said burner means at a specified velocity, said compressing means disposed between said mixing unit and said burner means;
   means for exhausting the products of said combustion, said exhausting means mated with said heat exchanger; and
   means for controlling the rate of combustion.

2. The gas flame frying apparatus of claim 1 wherein said means for supplying air comprises:
   a filter;
   an isolating valve engaged with said filter and operable to shut off said air supply to said mixing unit; and
   a control valve engaged with both said isolating valve and said mixing unit, said control valve being in communication with said controlling means and operable to vary the flow rate of said air available to said mixing unit.

3. The gas flame frying apparatus of claim 1 wherein said means for supplying fuel gas comprises:
   an isolating valve operable to shut off said fuel gas supply to said mixing unit;
   a governor engaged with said isolating valve and in communication with both said air supply means and said control means and operable to adjust the pressure of said fuel gas to ensure proper mixing;
   a check valve engaged with said governor and operable to allow the flow of said fuel gas in one direction only; and
   a control valve engaged with both said check valve and said mixing unit, said control valve being in communication with said controlling means and operable to vary the flow rate of said fuel gas available to said mixing unit.

4. The gas flame frying apparatus of claim 1 wherein said compressing means comprises:
   a compressor engaged with said outlet of said mixing unit, said compressor having an input side and a pressure side;
   a feed back line engaged with said compressor for returning a portion of said premixture from said pressure side of said compressor to said input side of said compressor;
   a pressure governor engaged with said feed back line and in communication with said control means for varying the amount of premixture delivered to said burner means;
   an oil trap engaged with said compressor for removing oil from said premixture;
   a control valve engaged with said oil trap and in communication with said control means, said control valve operable to vary the flow rate of said premixture available to said burner means; and
   a flame trap engaged with both said control valve and said burner means, said flame trap operable to prohibit a back burn or flash back through said compressing means.

5. The gas flame frying apparatus of claim 1 wherein said burner means comprises:
   a cylindrical shaped burner, and wherein;
   said combustion chamber is a closed cylindrical chamber disposed coaxial with said cylindrical shaped burner; and
   said heat exchanger comprises a plurality of sections disposed around said frypot, each section of said plurality of sections being connected to said combustion chamber by a connecting tube and each section of said plurality of sections being mated to said exhausting means.

6. The gas flame frying apparatus of claim 1 wherein said burner means comprises:
   a fiber metallic burner;
   means for igniting said fuel gas and air premixture; and
   means for sensing said flame.

7. The gas flame frying apparatus of claim 1 wherein said burner means comprises:
   a jet nozzle burner;
   means for igniting said fuel gas and air premixture; and
   means for sensing said flame.

8. The gas flame frying apparatus of claim 1 wherein said specified pressure of said pressurized premixture is between one and fifteen PSIG.

9. The gas flame frying apparatus of claim 1 wherein said heat exchanger comprises:
   a rear section mated with said combustion chamber;
   a front section opposite to said rear section;
   a pair of opposing side sections disposed between said front and rear sections; said side sections mated with said front section, said side sections further mated with said exhausting means; and
   a plurality of cylindrical tubes disposed between both said front and rear sections and said pair of opposing side sections, said plurality of cylindrical tubes interconnecting said front section to said rear section such that the high velocity products from said combination chamber enter said heat exchanger at said rear section, travel through said plurality of cylindrical tubes to said front section, then from said front section into said side sections and then into said exhausting means.

10. The gas flame frying apparatus of claim 1 wherein said heat exchanger comprises:
    a rear section mated with said combustion chamber;
    a front section opposite to said rear section;
    a pair of opposing side sections disposed between said front and rear sections, said side sections mated with said front section, said side sections further mated with said exhausting means; and
    a plurality of flat walled chambers disposed between both said front and rear sections and said pair of opposing side sections, said plurality of flat walled chambers having a plurality of baffles disposed in each of said plurality of flat walled chambers, said flat walled chambers interconnecting said front section to said rear section such that the high velocity products from said combustion chamber enter said heat exchanger at said rear section, travel through said plurality of flat walled chambers and around said plurality of baffles to said front section, then from said front section into said side sections and then into said exhausting means.

11. The gas flame frying apparatus of claim 1 wherein said heat exchanger comprises:
    a rear section mated with said combustion chamber;
    a front section opposite to said rear section said front section mated with said exhausting means;
    a pair of opposing side sections interconnecting said front and rear sections, each of said pair of opposing side sections having an outside wall defining an oscillating curved pattern such that the high velocity products from said combustion chamber enter said heat exchanger at said rear section, travel through said pair of opposing side sections past said oscillating curved pattern into said front section and then into said exhausting means.

12. The gas flame frying apparatus of claim 1 wherein said heat exchanger comprises:
    a rear section mated with said combustion chamber;
    a front section opposite to said rear section, said front section mated with said exhausting means;

a pair of opposing side sections interconnecting said front and rear sections, each of said pair of opposing side sections having an outside wall and an inside wall, said outside wall having a plurality of baffles extending from said outside wall towards said inside wall such that the high velocity products from said combustion chamber enter said rear section, travel through said pair of opposing side sections past said plurality of baffles into said front section and then into said exhausting means.

13. The gas flame frying apparatus of claim 1 wherein said controlling means comprises:
   a central control unit;
   means for storing a plurality of heating cycles, said storing means in communication with said central control unit such that said storing means provides information to said central control unit to control said rate of combustion.

14. The gas flame frying apparatus of claim 1 wherein said exhausting means includes an external heat recovery system for removal of residual heat energy.

15. The gas flame frying apparatus of claim 1 wherein said exhausting means includes a catalytic converter to remove toxic materials from said products of combustion.

16. The gas flame frying apparatus of claim 1 further comprising means for recirculating said cooking oil in said frypot.

17. A clean burning gas flame frying apparatus for cooking foods comprising:
   a frypot for holding cooking oil, said frypot including a heat exchanger and a housing defining a combustion chamber, said heat exchanger mated with said combustion chamber for transferring heat from said combustion chamber to said cooking oil;
   burner means located in the bottom of said frypot for combusting a pressurized fuel gas and air premixture for providing said heat, said pressurized fuel gas and air premixture being supplied to said burner means at a specified pressure, said housing surrounding said burner means;
   means for supplying pressurized air to said burner means;
   means for supplying pressurized fuel gas to said burner means;
   a mixing unit for said pressurized air and said pressurized fuel gas having an air inlet, a fuel gas inlet and an outlet, said mixing unit operable to create said pressurized fuel gas and air premixture, said mixing unit disposed between said burner means and said pressurized air and pressurized fuel gas supply means;
   means for exhausting the products of said combustion, said exhausting means mated with said heat exchanger; and
   means for controlling the rate of combustion.

18. The gas flame frying apparatus of claim 17 wherein said means for supplying pressurized air comprises:
   a filter;
   an air flow regulator engaged with said filter and operable to vary the pressure of said pressurized air supply to said mixing unit; and
   a control valve engaged with both said air flow regulator and said mixing unit, said control valve being in communication with said controlling means and operable to vary the flow rate of said pressurized air available to said mixing unit.

19. The gas flame frying apparatus of claim 17 wherein said means for supplying pressurized fuel gas comprises:
   a regulator operable to vary the pressure of said pressurized fuel gas supply to said mixing unit;
   a governor engaged with said regulator and in communication with both said air supply means and said controlling means and operable to adjust the pressure of said pressurized fuel gas to insure proper mixing;
   a control valve engaged with both said governor and said mixing unit, said control valve being in communication with said controlling means and operable to vary the flow rate of said pressurized fuel gas available to said mixing unit.

20. The gas flame frying apparatus of claim 17 wherein said burner means comprises:
   a cylindrical shaped burner, and wherein;
   said combustion chamber is a closed cylindrical chamber disposed coaxial with said cylindrical shaped burner; and
   said frypot comprises a plurality of heat exchanger sections disposed around said frypot, each section of said plurality of sections being connected to said combustion chamber by a connecting tube and each section of said plurality of sections being mated to said exhausting means.

21. The gas flame frying apparatus of claim 17 wherein said burner means comprises:
   a fiber metallic burner;
   means for igniting said fuel gas and air premixture; and
   means for sensing said flame.

22. The gas flame frying apparatus of claim 17 wherein said burner means comprises:
   a jet nozzle burner;
   means for igniting said fuel gas and air premixture; and
   means for sensing said flame.

23. The gas flame frying apparatus of claim 17 wherein said specified pressure of said premixture is between one and fifteen PSIG.

24. The gas flame frying apparatus of claim 17 wherein said heat exchanger comprises:
   a rear section mated with said combustion chamber;
   a front section opposite to said rear section;
   a pair of opposing side sections disposed between said front and rear sections, said side sections mated with said front section, said side sections further mated with said exhausting means; and
   a plurality of cylindrical tubes disposed between both said front and rear sections and said pair of opposing side sections, said plurality of cylindrical tubes interconnecting said front section to said rear section such that the high velocity products from said combustion chamber enter said heat exchanger at said rear section, travel through said plurality of cylindrical tubes to said front section, then from said front section into said side sections and then into said exhausting means.

25. The gas flame frying apparatus of claim 17 wherein said heat exchanger comprises:
   a rear section mated with said combustion chamber;
   a front section opposite to said rear section;
   a pair of opposing side sections disposed between said front and rear sections, said side sections mated with said front section, said side sections further mated with said exhausting means; and a plurality of flat walled chambers disposed between both said front and rear sections and said pair of opposing side sections, said plurality of flat walled chambers having a plurality of baffles disposed in each of said plurality of flat walled chambers, said flat walled chambers interconnecting said front section to said rear section such that the high velocity products from said combustion chamber enter said heat exchanger at said rear section, travel through said plurality of flat walled chambers and around said plurality of baffles to said front section, then from said front section into said side sections and then into said exhausting means.

26. The gas flame frying apparatus of claim 17 wherein said heat exchanger comprises:
a rear section mated with said combustion chamber;
a front section opposite to said rear section, said front section mated with said exhausting means;
a pair of opposing side sections interconnecting said front and rear sections, each of said pair of opposing side sections having an outside wall defining an oscillating curved pattern such that the high velocity products from said combustion chamber enter said heat exchanger at said rear section, travel through said pair of opposing side sections past said oscillating curved pattern into said front section and then into said exhausting means.

27. The gas flame frying apparatus of claim 17 wherein said heat exchanger comprises:
a rear section mated with said combustion chamber;
a front section opposite to said rear section, said front section mated with said exhausting means;
a pair of opposing side sections interconnecting said front and rear sections, each of said pair of opposing side sections having an outside wall and an inside wall, said outside wall having a plurality of baffles extending from said outside wall towards said inside wall such that the high velocity products from said combustion chamber enter said rear section, travel through said pair of opposing side sections past said plurality of baffles into said front section and then into said exhausting means.

28. The gas flame frying apparatus of claim 17 wherein said controlling means comprises:
a central control unit;
means for storing a plurality of heating cycles, said storing means in communication with said central control unit such that said storing means provides information to said central control unit to control said rate of combustion.

29. The gas flame frying apparatus of claim 17 wherein said exhausting means includes an external heat recovery system for removal of residual heat energy.

30. The gas flame frying apparatus of claim 17 wherein said exhausting means includes a catalytic convertor to remove toxic materials from said products of combustion.

31. A clean burning gas flame frying apparatus for cooking foods comprising:
a frypot for holding cooking oil, said frypot including a heat exchanger and a housing defining a combustion chamber, said heat exchanger mated with said combustion chamber for transferring heat from said combustion chamber to said cooking oil;
burner means located in the bottom of said frypot for combusting a pressurized fuel gas and air premixture for providing said heat, said pressurized fuel gas and air premixture being supplied to said burner means at a specified pressure, said housing surrounding said burner means;
means for supplying air to said burner means;
means for supplying fuel gas to said burner means;
means for compressing said air to provide pressurized air, said air compressing means disposed between said means for supplying air and said burner means
means for compressing said fuel gas to provide pressurized fuel gas, said fuel gas compressing means disposed between said means for supplying fuel gas and said mixing unit;
a mixing unit for said pressurized air and said pressurized fuel gas having an air inlet, a gas inlet and an outlet, said mixing unit operable to create said pressurized fuel gas and air premixture, said mixing unit disposed between said burner means and said means for supplying air and fuel gas;
means for exhausting the products of said combustion, said exhausting means mated with said heat exchanger; and
means for controlling the rate of combustion.

32. The gas flame frying apparatus of claim 31 wherein said means for supplying air comprises:
a filter;
a check valve engaged with both said filter and said means for compressing said air, said check valve operable to allow the flow of said air in one direction only.

33. The gas flame frying apparatus of claim 31 wherein said means for supplying fuel gas comprises:
an isolating valve operable to shut off said fuel gas supply to said means for compressing said fuel gas;
a governor engaged with said isolating valve and in communication with both said air supply means and said control means and operable to adjust the pressure of said fuel gas to insure proper mixing; and
a check valve engaged with both said governor and said means for compressing said fuel gas, said check valve operable to allow the flow of said fuel gas in one direction only.

34. The gas flame frying apparatus of claim 31 wherein said means for compressing said air comprises:
a compressor engaged with said means for supplying air, said compressor having an input side and a pressurized side;
a feedback line engaged with said compressor for returning a portion of said air from said pressure side of said compressor to said input side of said compressor;
a pressure governor engaged with said feedback line and in communication with said controlling means for varying the amount of air delivered to said mixing unit;
an oil trap engaged with both said compressor and said mixing unit for removing oil from said air.

35. The gas flame frying apparatus of claim 31 wherein said means for compressing said fuel gas comprises:
a compressor engaged with said means for supplying fuel gas, said compressor having an input side and a pressure side;
a feedback line engaged with said compressor for returning a portion of said fuel gas from said pressure side of said compressor to said input side of said compressor;
a pressure governor engaged with said feedback line and in communication with said control means for varying the amount of fuel gas delivered to said mixing unit;

an oil trap engaged with both said compressor and said mixing unit for removing oil from said fuel gas.

36. The gas flame frying apparatus of claim 31 wherein said burner means comprises:

a cylindrical shaped burner, and wherein;

said combustion chamber is a closed cylindrical chamber disposed coaxial with said cylindrical shaped burner; and said heat exchanger comprises a plurality sections disposed around said frypot, each section of said plurality of section being connected to said combustion chamber by a connecting tube and each section of said plurality of sections being mated to said exhausting means.

37. The gas flame frying apparatus of claim 31 wherein said burner means comprises:

a fiber metallic burner;

means for igniting said fuel gas and air premixture; and means for sensing said flame.

38. The gas flame frying apparatus of claim 31 wherein said burner means comprises:

a jet nozzle burner;

means for igniting said fuel gas and air premixture; and means for sensing said flame.

39. The gas flame frying apparatus of claim 31 wherein said specified pressure of said premixture is between one and fifteen PSIG.

40. The gas flame frying apparatus of claim 31 wherein said heat exchanger comprises:

a rear section mated with said combustion chamber;

a front section opposite to said rear section;

a pair of opposing side sections disposed between said front and rear sections, said opposing side sections mated with said front section, said side sections further mated with said exhausting means; and a plurality of cylindrical tubes disposed between both said front and rear sections and said pair of opposing side sections, said plurality of cylindrical tubes interconnecting said front section to said rear section such that the high velocity products from said combustion chamber enter said heat exchanger at said rear section, travel through said plurality of cylindrical tubes to said front section, then from said front section into said side sections and then into said exhausting means.

41. The gas flame frying apparatus of claim 31 wherein said heat exchanger comprises:

a rear section mated with said combustion chamber;

a front section opposite to said rear section;

a pair of opposing side sections disposed between said front and rear sections, said opposing side sections mated with said front section, said side sections further mated with said exhausting means; and a plurality of flat walled chambers disposed between both said front and rear sections and said pair of opposing side sections, said plurality of flat walled chambers having a plurality of baffles disposed in each of said plurality of flat walled chambers, said flat walled chambers interconnecting said front section to said rear section such that the high velocity products from said combustion chamber enter said heat exchanger at said rear section, travel through said plurality of flat walled chambers and around said plurality of baffles to said front section, then from said front section into said side sections and then into said exhausting means.

42. The gas flame frying apparatus of claim 31 wherein said heat exchanger comprises:

a rear section mated with said combustion chamber;

a front section opposite to said rear section; said front section interconnected with said exhausting means;

a pair of opposing side sections interconnecting said front and rear sections, each of said pair of opposing side sections having an outside wall defining an oscillating curved pattern such that the high velocity products from said combustion chamber enter said heat exchanger at said rear section, travel through said pair of opposing side sections past said oscillating curved pattern into said front section and then into said exhausting means.

43. The gas flame frying apparatus of claim 31 wherein said heat exchanger comprises:

a rear section mated with said combustion chamber;

a front section opposite to said rear section, said front section mated with said exhausting means;

a pair of opposing side sections interconnecting said front and rear sections, each of said pair of opposing side sections having an outside wall and an inside wall, said outside wall having a plurality of baffles extending from said outside wall towards said inside wall such that the high velocity products from said combustion chamber enter said rear section, travel through said pair of opposing side sections past said plurality of baffles into said front section and then into said exhausting means.

44. The gas flame frying apparatus of claim 32 wherein said controlling means comprises:

a central control unit;

means for storing a plurality of heating cycles, said storing means in communication with said central control unit such that said storing means provides information to said central control unit to control said rate of combustion.

45. The gas flame frying apparatus of claim 31 wherein said exhausting means includes an external heat recovery system for removal of residual heat energy.

46. The gas flame frying apparatus of claim 31 wherein said exhausting means includes a catalytic convertor to remove toxic materials from said products of combustion.

47. The gas flame frying apparatus of claim 17 further comprising means for recirculating said cooking oil in said frypot.

48. The gas flame frying apparatus of claim 31 further comprising means for recirculating said cooking oil in said frypot.

* * * * *

UNITED STATES PATENT AND TRADEMARK OFFICE
CERTIFICATE OF CORRECTION

PATENT NO. : 5,209,218
DATED : May 11, 1993
INVENTOR(S) : Manouchehr Daneshvar et al.

It is certified that error appears in the above-identified patent and that said Letters Patent is hereby corrected as shown below:

Column 1, line 29, "apparatus" should be --apparatuses--.

Column 2, line 53, "13'13" should be --13—13--.

Column 5, line 23, "mention" should be --mentioned--.

Column 6, line 32, after "Fercalloy", insert --,--.

Column 8, line 18, "exist" should be --exists--.

Column 8, line 57, "compress" should be --compressed--.

Column 9, line 44, "drying" should be --frying--.

Column 9, line 59, "explainer" should be --explained--.

Column 9, line 60, "FIG." should be --FIGS.--.

Column 12, line 23, claim 9, "combination" should be --combustion--.

Column 16, line 7, claim 31, after "means" (second occurrence), insert --;--.

UNITED STATES PATENT AND TRADEMARK OFFICE
CERTIFICATE OF CORRECTION

PATENT NO. : 5,209,218

DATED : May 11, 1993

INVENTOR(S) : Manouchehr Daneshvar et al.

It is certified that error appears in the above-identified patent and that said Letters Patent is hereby corrected as shown below:

Column 17, line 11, claim 36, after "plurality", insert --of--.

Signed and Sealed this

Fifth Day of April, 1994

Attest:

BRUCE LEHMAN

Attesting Officer

Commissioner of Patents and Trademarks